Figure 2:
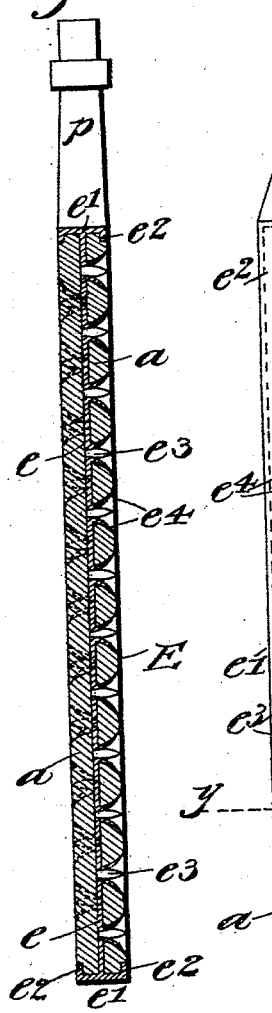

(No Model.)

O. PIRSCH.
ELECTRODE FOR SECONDARY BATTERIES.

No. 556,769. Patented Mar. 24, 1896.

Witnesses.
D. S. Ober
[signature]

Inventor:
Oscar Pirsch
[signature]
Attorney.

UNITED STATES PATENT OFFICE.

OSCAR PIRSCH, OF LIEGE, BELGIUM.

ELECTRODE FOR SECONDARY BATTERIES.

SPECIFICATION forming part of Letters Patent No. 556,769, dated March 24, 1896.

Application filed March 11, 1895. Serial No. 541,351. (No model.) Patented in Belgium July 24, 1894, No. 1,113,111.

*To all whom it may concern:*

Be it known that I, OSCAR PIRSCH, a citizen of Belgium, residing at Liege, Belgium, have invented certain new and useful Improvements in Electrical Accumulators, (for which I have received Letters Patent in Belgium, No. 1,113,111, dated July 24, 1894;) and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention has relation to electrodes for electric storage or secondary batteries.

Both theoretically and practically the capacity of electrodes for storage-batteries has been calculated by the square inch of surface for the reason that the impracticability of using an active material of considerable thickness has been fully demonstrated by practice. It is true that the thickness of active material in electrodes as heretofore constructed has varied considerably; but practice has demonstrated that this thickness could not exceed three millimeters, owing to the lack of conductivity of such material, and it having been found that whenever this limit of thickness is exceeded those portions of the active material beyond such limit remain inactive by reason of their distance from the conductive core of the electrode and the resistance of the material to the electrolytic action. In view of this the electrician has been confined to superficial area instead of cross-sectional area of the active material, in the aim of increasing the capacity of electrodes for storage-batteries, and in order to provide a sufficiently-stable support for so extensive an area of active material cores of cast metal have been employed, resulting in an abnormally large and heavy electrode as compared with its capacity. Furthermore, with the increase in the superficial area of the electrode the electrician encountered another very serious difficulty in that the period of usefulness of the electrode was shortened, I may say, in proportion to the increase in the superficial area, by reason of the active material becoming detached from its core. To remedy this the core has been provided with protuberances of various forms, such as solid and tubular, while the latter have been made flaring at their outer end or provided at said end with radial or diverging arms or teeth to form keys or anchors for the purpose of more permanently connecting the active material with its core, which also resulted in an increase in the weight of such core, and consequently of the electrode, without a corresponding reduction in its size.

The objects of my invention are threefold.

First, to reduce the dimensions and weight of the electrode to a minimum relatively to a given capacity. This I attain by the use of the thinnest possible conductive core—namely, a core of sheet metal—and a mass of active material on both of its faces of such thickness as will enable me to reduce the dimensions of the electrode in length and width to a minimum without reducing the capacity or active area thereof.

Second, the provision of means for firmly connecting the active mass with the faces of the core to prevent such active mass from becoming detached under electrolytic action or when the electrode is subjected to shocks due to jarring or vibrations of its support and whereby the active material and its thin sheet-metal core will mutually support each other. This I attain by providing the core on both faces with conductive projections constructed to perform the function of anchors for the active mass.

Third, the provision of means whereby every molecule of active material on both faces of the core is brought within the field of influence, or, I may say, in contact with the conductive core, which I accomplish by making the conductive projections or points of such length as to penetrate into the mass of active material to or approximately to the surface thereof, and by multiplying these conductors to such an extent as to bring them into such close proximity that every molecule of the active material will be brought within their field of influence and that of the core. This may be more readily effected by means of ramified conductive projections—that is to say, by forming the conductors of diverging or otherwise spreading arms—so as to extend their field of influence as much as is necessary throughout the active material.

An electrode constructed as described fulfills, therefore, the objects and aim of my invention, in that I am enabled to largely increase the collective capacity of such electrode without proportionally increasing the dimensions in width and length and the weight thereof.

That my invention may be fully understood I will describe the same in detail, reference being had to the accompanying drawings, in which—

Figure 1:
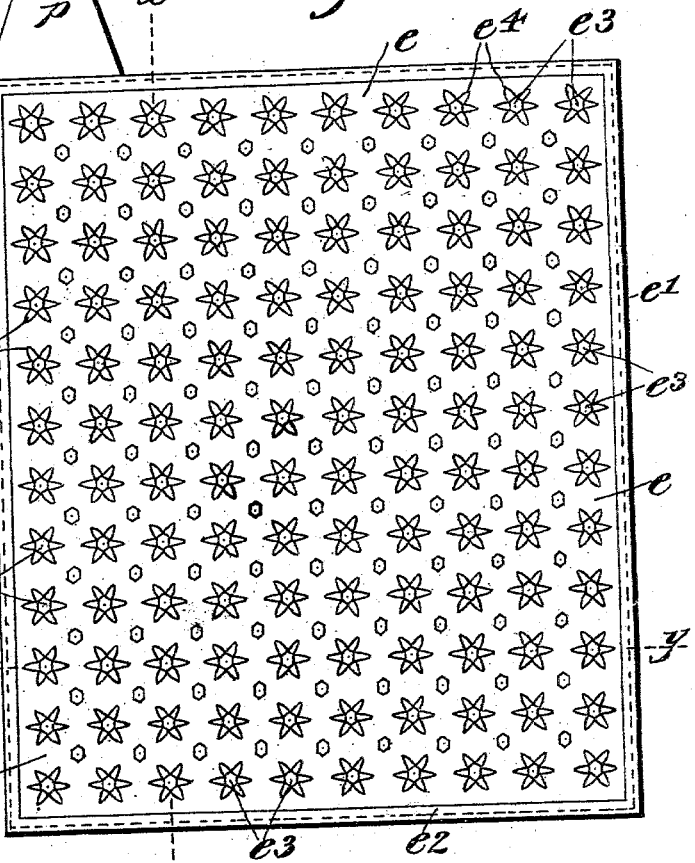
Figure 3:
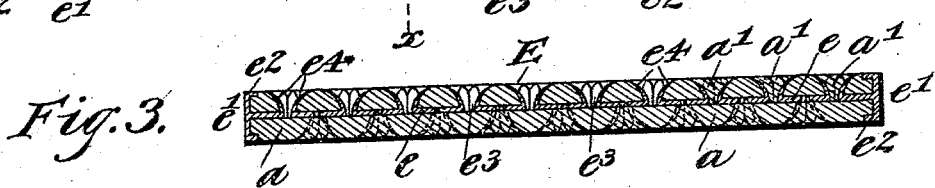

Figure 1 is a face view of the conductive core of the electrode; and Figs. 2 and 3 are sections taken, respectively, on lines $x\,x$ and $y\,y$ of Fig. 1, showing the active material applied to said core.

The electrode E is composed of a sheet-metal conductive core, hence very thin and light, which in horizontal and vertical cross-section is of a general I shape, the members $e'$ at right angles to the web $e$ having inwardly-turned flanges $e^2$, forming a frame for said web $e$ that overhangs both faces thereof, the inturned flanges $e^2$ serving to retain the active material $a$ along the edges of the conductive core. The web $e$ is provided with hollow projections $e^3$, which may be formed by punching or otherwise, so as to form a plurality of upward and outwardly diverging arms or teeth $e^4$, which not only serve as anchors for the active material $a$, but also as conductors that connect the said material with the core or web $e$. These armed or toothed projections are of such a length that the extremities of the diverging arms will lie upon or slightly below the surface of the active material, and the number of these projections is such as to bring every molecule of the active material within their field of action and that of the core or web $e$—that is to say, the arrangement of the projections $e^3$ is such that but comparatively small masses of active material are out of direct contact therewith, so small, in fact, as to bring them within their field of influence.

It is obvious that in the construction described an active material of any desired thickness, so to say, may be employed with a proper ramification of conductors throughout the mass connected with the core or web $e$, so that, contrary to general practice and accepted theory, an active material of great thickness can be employed in conjunction with a very thin conductive core and that without correspondingly or proportionately increasing the length and width of the said core.

In order that the whole of the active material when of an abnormal thickness as compared with the thickness hitherto accepted or considered as practical or efficient may be rendered effective, it is necessary that such material should be completely permeated by the exciting liquid—i. e., the electrolyte—and this I attain by applying the active agent without unduly packing or compressing the same. It is further necessary that the reactions should take place simultaneously throughout the mass of the active material and that the osmotic exchange should take place rapidly and without obstruction, and this is accomplished, as above stated, by multiplying the points of contact between the active material and conductive core sufficiently and by so distributing or ramifying the same throughout the mass of active material as to bring the whole of it within the field of influence of the conductive core.

If desired the outer surface of the core-frame $e'\,e^2$ can be protected against the action of the electrolyte by coating the same with a suitable substance capable of resisting such action, the nature of the substance depending of course upon the electrolyte.

From an inspection of the drawings it will be seen that in my improved construction of electrode the weight of the conductive core which does not participate in the chemical reaction will be much less than that of the cores heretofore employed, and that the weight of the said core relatively to the mass of active material employed is more properly proportioned and will give better results than is the case with electrodes of this class as heretofore constructed. In fact, the core $e$ may be made as thin as desired, as it is not necessary that it should be self-supporting, as has been the case heretofore, as the said core and active material materially support each other, assisted by the framing $e'\,e^2$, which latter can be widened or enlarged to any desired degree without correspondingly increasing the thickness of the web $e$.

Inasmuch as the frame $e'\,e^2$ can be protected against the action of the electrolyte, as hereinbefore stated, and as the web $e$ is practically protected against such action, the electrode is not liable to speedy destruction.

Although I have shown the projections or hollow studs $e^3$ as devoid of a filling of active material, it is obvious that such material may be applied to the core so as to fill said projections, as shown at $a'$, Fig. 3.

Having thus described my invention, what I claim as new, and desire to secure by Letters Patent, is—

1. A conductive core for storage-battery electrodes constructed of thin sheet-lead and provided on both faces with outwardly-flaring tubular projections having radially-diverging and overhanging teeth or branches $e^4$, the rows of projections on one face substantially occupying the space between the rows of projections on the opposite face, for the purpose set forth.

2. A conductive core for storage-battery electrodes comprising a web of thin sheet metal and an encompassing frame said web having on both faces rows of outwardly-flaring tubular projections provided with radially-diverging overhanging teeth or branches on a level with the outer edge of the frame, the rows of projections on one face substantially occupying the space between the rows of projections on the opposite face, for the purpose set forth.

3. An electrode for storage-batteries consisting of a conductive core of thin sheet metal having a comparatively-wide encompassing framing *e* whose edges *e'* are turned inwardly, said web provided with rows of tubular outwardly-flaring projections having radially-diverging overhanging teeth or branches on a level with the outer edge of the framing, the rows of projections on one face substantially occupying the space between the rows on the opposite face and an active material applied to both faces of the core flush with the outer edge of the framing thereof, substantially as and for the purpose set forth.

In testimony whereof I affix my signature in presence of two witnesses.

OSCAR PIRSCH.

Witnesses:
NICHOLAS SMITH,
IDA SMITH.